United States Patent

[11] 3,549,085

| | | |
|---|---|---|
| [72] | Inventor | Robert L. Hart<br>Manhasset Hills, N.Y. |
| [21] | Appl. No. | 825,021 |
| [22] | Filed | May 15, 1969 |
| [45] | Patented | Dec. 22, 1970 |
| [73] | Assignee | W. R. Grace & Co.<br>a corporation of Connecticut. by mesne assignment |

[54] BAG HAVING A SINGLE SUSPENSION MEMBER
6 Claims, 14 Drawing Figs.

[52] U.S. Cl. .................................................. 229/54, 150/12
[51] Int. Cl. .................................................. B65d 31/00; B65d 33/06
[50] Field of Search ....................................... 229/54; 150/12; 93/35(H)

[56] References Cited
UNITED STATES PATENTS

| | | | |
|---|---|---|---|
| 3,348,761 | 10/1967 | Vetter | 229/54 |
| 3,429,498 | 2/1969 | Dorfman | 229/54 |

Primary Examiner—David M. Bockenek
Attorneys—John J. Toney, William D. Lee, Jr. and Edward J. Hanson ABSTRACT: A limp flexible transparent bag includes opposed registered polyethylene walls, an open mouth and an integral flap extending alongside the mouth from one wall beyond the opposite shorter wall. The flap is foldable at its base so that it may selectively close the mouth. A molded polyethylene suspension member including a horizontal bar and a suspension hook or handle projecting upwardly therefrom is secured to the inner surface of the shorter wall adjacent its upper edge. The bar includes tiny projections along one of its faces to which the portion of the shorter wall abutting the bar is heat sealed. The suspension hook or handle is insertable through a slit in the base of the flap and once inserted therethrough, maintains the flap in a folded down position with the suspension member in operative position and also holding the flap closed.

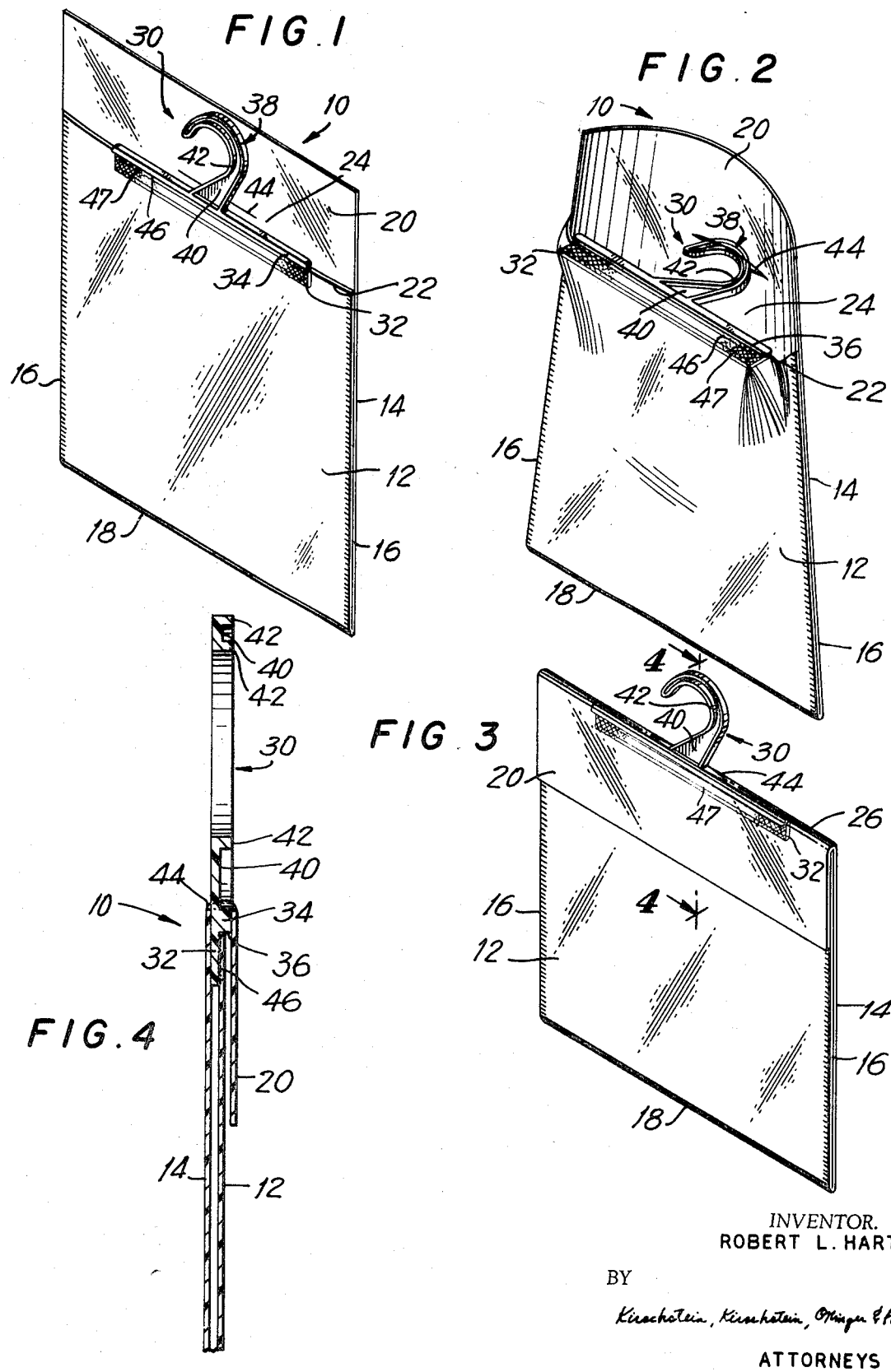

INVENTOR.
ROBERT L. HART

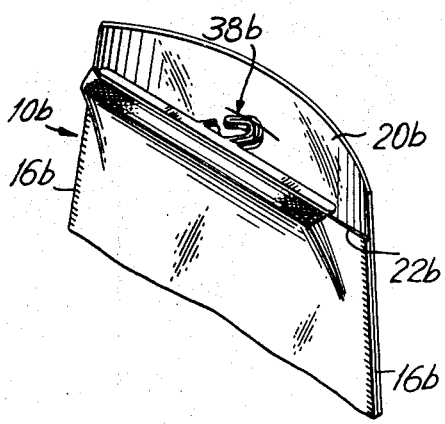
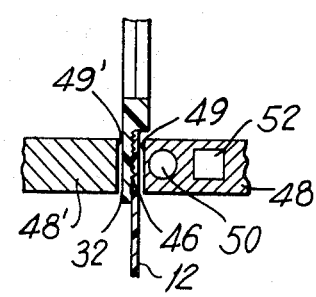
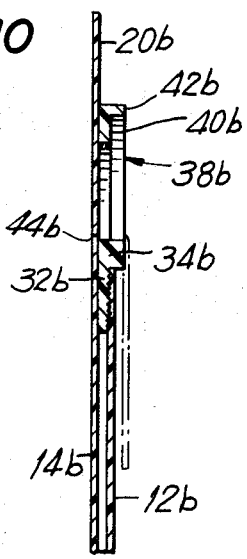
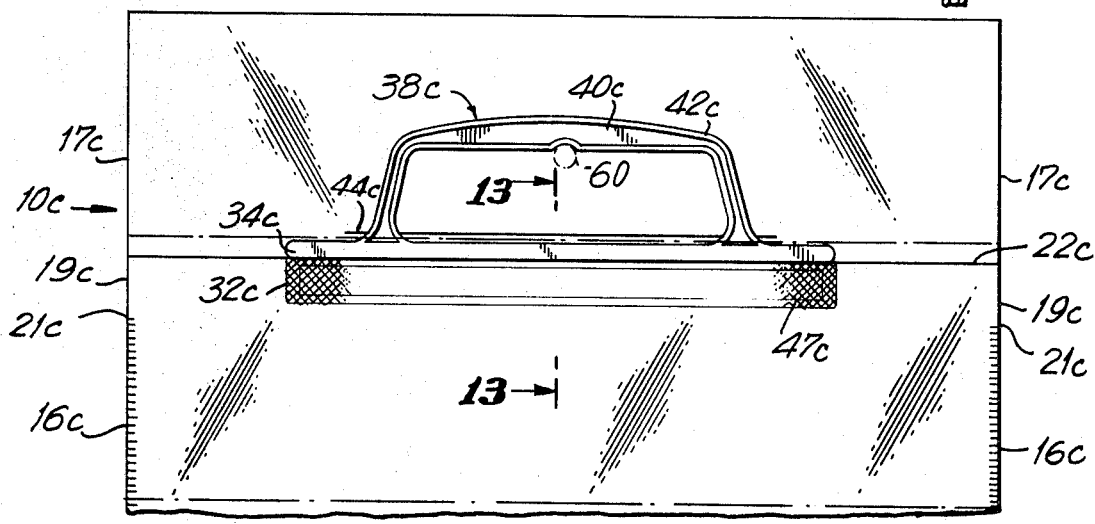
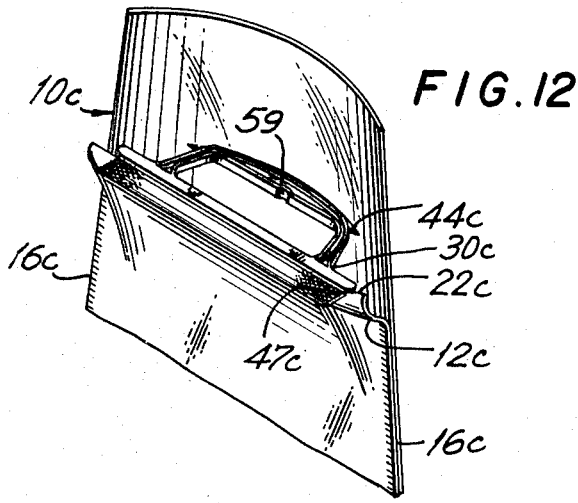
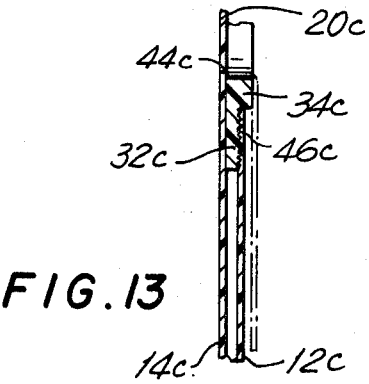

BAG HAVING A SINGLE SUSPENSION MEMBER

BACKGROUND OF THE INVENTION

1. Field of the Invention

Suspendable plastic bags having closure flaps and a method of making the same.

2. Description of the Prior Art

There have been known heretofore suspension bags which included handles secured to the walls of the bag adjacent an open mouth. In most instances, such as in the more familiar paper shopping bags, two handles were used, one fastened to each wall and when both handles were clasped in one hand, the mouth of the bag would be relatively closed.

With the advent of plastics the use of bags formed of sheets of plastic such as polyvinyl chloride film has increased. In most of the previous plastic bags having some type of suspension member, usually a tote handle or a suspension hook, the use of a separate fastener to close the mouth of the bag was necessary. Generally, the prior suspension members included a base having halves sealed to the opposite walls of the plastic bag. Two handles or hooks were most common and the opposed handles were releasably joined together to close the mouth of the bag in a manner reminiscent of that employed in the previous shopping bags. Occasionally used in conjunction with these bags were snaps or some other fastening arrangement such as a slide fastener to independently close the bag mouth.

Additionally known heretofore was the use of a single suspension or carrying handle attached to only one wall of a bag. In order to constrict or close the mouth of the bag with this arrangement, a separate tab or snap fastener was utilized. The fastener would either be integral with the suspension member or separate therefrom; in either event a registered releasable mating engagement between the wall opposite the suspension handle and the fastener, usually integral with or positioned below the handle, was required to close the bag mouth.

The cost of either two suspension members and/or a separate fastener to close the mouth of the bag unduly increased the cost of the bag. Furthermore, with the use of a separate closure member, a plurality of steps were necessary to close and carry the bag.

Additionally these prior bags were oftentimes unwieldy because the busy shopper would have to perform an awkward operation to close the mouth of the bag which was annoying and frequently resulted in the shopper carrying the bag in an open condition.

While a customer is shopping with most of the previous bags, a pickpocket could readily open the bag to gain access to the interior and remove articles therefrom with the shopper still firmly holding the handle or handles and unaware of the theft. This is because with two carry handles as the means for holding a bag closed, access to the interior of the bag may be gained through the portions of the mouth which are still open. If a single-handle bag is used, or a double handle bag with separate fastening means, the bag still may be opened while the handle or handles is held as the fastening means are generally separate from the handle and merely holding the bag by the handle will not prevent the bag from opening.

SUMMARY OF THE INVENTION

It is an object of the present invention to provide a suspendable bag of the character described which is so constructed that it is not subject to any of the foregoing drawbacks.

More specifically, it is an object of the invention to provide a suspendable bag of the character described which is simple and rugged in construction, yet can be fabricated by mass production methods at an appreciably lower cost than prior bags designed to serve the same function.

It is a further object of the present invention to provide a bag of the character described which can be suspended by a single suspension member, the same serving to additionally maintain a closure flap in a closed position without utilizing a separate fastening member.

A still further object of the present invention is to provide a bag of the character described wherein a single suspension member may be easily and simply utilized to engage a portion of a closure flap, maintaining the same in closed position while at the same time suspending the bag and preventing anyone from opening the closure flap as long as the suspension member supports the bag.

A further object of the present invention is to provide a bag device of the character described wherein a limp flexible polyethylene film which forms a wall of the bag is welded to a relatively thick heavier gauge polyethylene, and therefore inherently compatible, suspension member whereby the suspension member may support the weight of the bag and any contents therein without separating from the bag.

A still further object of the present invention is to provide a method wherein a wall of a limp flexible bag formed of opposed registered walls of polyethylene film may be welded to a roughened surface of a thick, e.g. injection molded, polyethylene suspension member to provide a durable interconnection.

It is another object of the present invention to provide a bag of the character described wherein the bag is constructed of opposed registered walls of polyethylene film with a thick polyethylene suspension member heat welded to one of the walls, the suspension member being engageable in a slit formed adjacent the top of the other of said walls.

Other objects of the invention in part will be obvious and in part will be pointed out hereinafter.

The invention accordingly constitutes the features of construction, combinations of elements and arrangements of parts which will be exemplified in the bag structure hereinafter described and of which the scope of application will be indicated in the appended claims.

BRIEF DESCRIPTION OF THE DRAWINGS

In the accompanying drawings in which are shown various possible embodiments of the invention:

FIG. 1 is a perspective view of one embodiment of the invention showing a display bag having an open closure flap and a hook suspension member joined to the wall of the bag opposite the flap;

FIG. 2 is a perspective view of the display bag shown in FIG. 1 as the hook member is being inserted through a slit at the base of the closure flap;

FIG. 3 is a perspective view of the display bag shown in FIG. 2 after the hook member has been inserted, with the flap folded down over, and thereby closing, the mouth of the bag;

FIG. 4 is an enlarged cross-sectional view taken substantially along the line 4—4 of FIG. 3;

FIG. 9 is a reduced scale fragmentary perspective view of the embodiment shown in FIG. 8 showing the relative positions of the components as the hook member is inserted through a slit in the base of the flap;

FIG. 10 is a fragmentary sectional view taken substantially along the line 10—10 of FIG. 8 and showing the welded engagement of the suspension member and one wall of the bag, additionally shown in dot-and-dash lines is the flap in closed position;

FIG. 11 is a fragmentary front view of an additional embodiment showing a handle suspension member and showing in dot-and-dash lines, the flap in closed position and a post from which the bag may be suspended;

FIG. 12 is a fragmentary perspective view of the embodiment shown in FIG. 11 as the handle member is inserted through a slit in the base of the flap member;

FIG. 13 is a fragmentary sectional view taken substantially along the line 13–13 of FIG. 11 with the welded engagement of the handle member and one wall of the bag, additionally shown in dot-and-dash lines is the flap in a folded over closed position; and FIG. 14 is a fragmentary sectional view showing the a manner in which a suspension member is welded to a wall of the bag.

DESCRIPTION OF THE PREFERRED EMBODIMENTS

Figure 5:
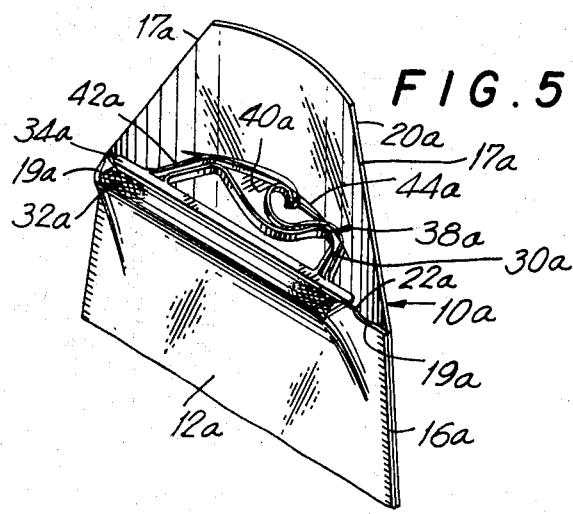
FIG. 5 is a fragmentary perspective view of another embodiment of the invention showing a handle-hanger suspension member as it is inserted through a slit at the base of a closure flap.

In accordance with the present invention a limp flexible bag is formed of opposed registered films of sheet polyethylene. A typical film thickness is from about 1 mil to 3 mils. The side and bottom mating edges is of the registered films are suitably joined by a heat seal. Optionally, a single sheet may be utilized with the bottom or a side edge of the bag formed as a fold line. One of the films extends to a higher elevation than the opposite shorter film and can be folded downwardly over the upper edge of the shorter film to form a flap which will close the otherwise open mouth of the bag.

A thick (thicker than the film) polyethylene suspension member, made for example by injection molding and typically ranging in thickness from one-sixteenth of an inch to one-eighth of an inch, is heat welded to the shorter film adjacent the upper edge thereof with a portion of the suspension member projecting above said upper edge. Because both the film and suspension member are composed of polyethylene they are compatible and, once joined by an autogenous heat and pressure weld, will not separate. At the fold line or base of the flap portion, an elongated opening or slit is formed of a size large enough to allow a portion of the suspension member to pass therethrough. Said portion of the suspension member is thrust through the opening and then the flap is folded down. In this position the bag may be suspended by engagement of the projecting portion with a supporting member which may be the hand or an inanimate object, such as a hook or rod for instance. If so suspended, the flap can not slip or open from its overlapping folded over position.

In order to securely maintain the welded engagement between the shorter wall of the bag and the suspension member, a novel system of heat welding the mating polyethylene suspension member and film has been devised. A flat surface of the thick gauge polyethylene suspension member is roughened to form a pattern of tiny raised projections which enable a strong bond to be made when the film and the suspension member are pressed and heated between opposed heat-sealing jaws.

It is observed in passing that heretofore when such a thin film of polyethylene was attempted to be sealed to a much heavier molded member of the same material a very poor and unacceptable bond, if any, was formed, the tendency being to melt a hole in the film before an employable bond was created by fluidification of surface areas only of the film and the facing part of the heavier suspension member. This difficulty has been overcome by the provision of the above mentioned tiny projections on the facing part of the suspension member.

Referring now in detail to the drawings, the reference numeral 10 denotes a display bag with a hook suspension member constructed in accordance with one embodiment of the invention. The display bag 10 is formed of registered front 12 and rear 14 films of polyethylene. The films are suitably joined at their side edges 16 as by a heat seal. The bottom edge 18 may be heat sealed; optionally it may be constructed as a fold of a single sheet of polyethylene used for both the front and rear films.

The choice of polyethylene film as the material of which the display bag is formed is a result of the consideration of the advantageous physical properties of polyethylene sheets which render it ideal for such application, particularly wherein it is desirable to view the contents of a bag without opening the same. Retailers may utilize the polyethylene bags of the present invention suspended on racks for display merchandising purposes. Polyethylene film provides a high clarity and does not yellow, craze or shrink after long exposure to both sunlight and the atmosphere. Additionally, polyethylene film provides a package with a pleasant tactile texture which adds in the saleability of the merchandise contained therein, especially in view of the fact that most consumers examine both the merchandise and the package before purchasing same.

In addition to the aforementioned advantages gained from the utilization of polyethylene film for display merchandising bags, it has been found that the polyethylene film maintains dimensional stability, is nontoxic, withstands extremes of high and low temperatures and may be indefinitely stored so that a large stock may be maintained by either a manufacturer, wholesaler or retailer without the fear that the bags may lose their effectiveness and value due to aging. The toughness and durability of polyethylene films renders such films ideal for application as the material from which carry and display bags are made. Polyethylene film is strong and, therefore, resists tearing when merchandise is carried within the bag of the present invention. Thus a shopping bag is available which may be used for a much longer period of time than conventional paper bags, which may effectively display advertising matter to persons other than the user, and completely satisfies the user in view of the durable quality of the bag.

Referring now to the structure of the embodiment of FIGS. 1–4, there is an integral flap 20 which projects upwardly from the rear film 14 beyond and above the upper edge 22 of the front film 12.

The front and rear films are not joined except at the side and bottom edges. An open mouth 24 is accordingly presented between the front and rear films at the upper edge 22, so that articles may be inserted within the bag 10. The flap 20 may then be folded at a fold line 26 over the upper edge 22 of the front film to close the mouth 24. Said fold line is located at the base of the flap where the flap joins the upper edge of the rear film 14.

To suspend a bag from a display rack, an injection molded suspension member 30 is provided. The suspension member includes an elongate flat base 32 of approximately rectangular cross section (see FIG. 4) illustrated in a generally horizontal position and designed to maintain that position when the display bag 10 is pendant and supported therefrom. One face of the base is secured to the interior surface of the front film 12 adjacent the upper edge thereof and within the open mouth of the bag. The suspension member, as above mentioned, is considerably thicker than the film and, therefore, is quite stiff. This is necessary for it to function as a suspension member which it could not do if it were quite flexible; however it raises a certain problem in connection with the present invention which problem is overcome in a manner which will soon be described.

The base must be of a length which is less than the width of the bag. Such difference in lengths, which preferably is split evenly at the two ends of the base, is not less than about one-half the distance the suspension member, in toto, projects above the bag mouth, the purpose thereof being pointed out hereinafter. A portion of the base extends downwardly into the bag. An overhanging reinforcing strip 34 is unitarily molded with the base and projects toward the front face of the front film. The strip 34 is wider than the base 32 so that a shoulder 36 designed to abut the upper edge 22 of the front film is formed. The shoulder projects over the upper edge 22 and facilitates the positioning of the suspension member during assembly.

A suspension hook 38 projects unitarily upwardly from the reinforcing strip 34 to engage a display rack, hook or rod and suspend the bag therefrom. The suspension hook 38 is formed of an upwardly directed web 40 arcuately bent with a downwardly directed tip. From the periphery of the web a reinforcing flange 42 extends. The flange 42 serves to stiffen and strengthen the suspension hook so that it may support the weight of the bag and the merchandise contained therein and thus performs the same function for the hook that the strip 34 performs for the base 32.

The flap 20 includes a means whereby it may selectively engage the suspension hook 38 to both maintain the flap in closed position and, additionally, enable the flap to be folded over the upper edge 22 of the front film while exposing the suspension hook for effective operation.

The means whereby this engagement is effected is a slit, (this term is used generally to denote a slit, slot, weakened zone or line of perforations) 44 formed in the rear film 14 adjacent the fold line 26 at the base of the flap. The slit 44 is of a dimension which is greater than the maximum transverse width of the suspension hook 38 and is preferably centrally located along the length of the fold line; similarly the suspension hook 38 is centrally located along the length of the upper edge 22.

With the flap 20 in the open position leaving the open mouth 24 uncovered, a person wishing to close the flap and the mouth, need only pull the upper edge 22 of the front film away from the rear film while swinging the suspension member downwardly so that the suspension hook is directed toward and into the slit as illustrated in FIG. 2. Attention is directed to the fact that if the base 32 were as long as the width of the bag the front film could not be pulled far enough away from the rear film to permit the manipulation of the suspension member as just described. True, the suspension member could be bowed to a slight extent to space apart the centers of the front and back films so as to allow the swinging mentioned above; but this would be a difficult operation to perform and require considerable dexterity. However by making the base shorter than the width of the bag to the extent specified, the desired separation of the front and back film is accomplished with ease.

After the manipulation, the suspension hook is thrust completely through the slit so that the upper surface of the strip 34 abuts the fold line 26 of the flap and the flap is folded downwardly over and covers the upper edge 22 of the front film.

To open the bag and remove the contents it is of course necessary to open the flap, illustrated in the closed position in FIGS. 3 and 4. As long as the display bag is suspended on a suitable suspension rack, the bar of which engages the suspension hook 38, it is impossible to open the flap as the slit cannot be disengaged from the suspension hook.

To open the display bag and remove the contents therefrom, it is necessary to remove the suspension hook from the display rack and lift the flap upwardly while at the same time separating the front and rear films by spreading the films apart at the upper edge of the front film. The suspension hook may then be withdrawn through the slit and disengaged and the flap may be opened.

The suspension member 30 is molded of one-piece polyethylene construction and includes on the base 32 a means whereby a durable and strong bond is obtained between the mating surfaces of a face of the base and the interior face of the opposed front film of the bag.

The mating surfaces are preferably welded in a manner to be described hereinafter. The surface of the bar to be welded is first prepared by roughening the same so that tiny discrete raised portions 46 are formed. These portions are formed in any appropriate manner, preferably by supplying the mold with a matching (reverse) configuration or by a knurling device which produces a series of evenly distributed diamond shaped pyramidal projections on the surface. The projections have a height within the range of 0.003 inches to 0.010 inches and preferably are 0.005 inches to 0.006 inches high.

These tiny projections enable the polyethylene suspension member and polyethylene film to be securely autogenously welded together at a suitable fusing temperature by opposed registered sealing pressure jaws 48 and 48' illustrated in FIG. 14.

The jaw 48 can be rapidly electrically heated adjacent its sealing surface by a suitable resistance or coil or induction heating heater 50 and can be rapidly cooled by a coolant circulating through a cooling passage 52.

In order to effect the welded engagement between the polyethylene film and the polyethylene suspension member, the mating polyethylene surfaces are placed in abutting contact and positioned between the sealing jaws 48 and 48'. The contacting plate surfaces 49 and 49' of the jaws are necessarily narrower and shorter than the roughened surface of the suspension member. This precaution precludes the possibility of burning through the polyethylene film which would occur if the sealing area of the film abutting the sealing jaw were not backed by the thick polyethylene molded suspension member. The resulting fused surface 47 is of smaller dimension than the roughened surface of the base.

In operation, the opposed film and suspension member are inserted between the jaws, the jaws are pressed together and the jaw 48 is heated almost instantaneously to a temperature of approximately 1,200° F. with a dwell time of about two-tenths of a second after which the temperature is immediately lowered, the jaws are then separated and the autogenously welded film and suspension member are removed.

The tiny raised projections 46 of the base 32 upon the application of such heat and for this short period of time fuse-bond to the surface of the polyethylene film which surface fuses under the heat and pressure of the sealing jaws thus effecting a tough and durable polyethylene weld without destroying the film.

Figure 7:
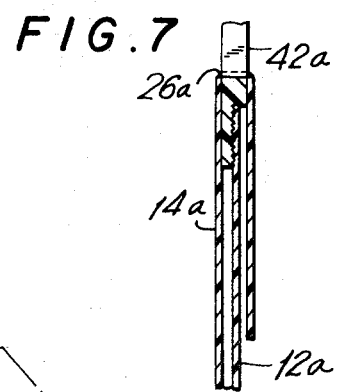
FIG. 7 is a fragmentary sectional view taken substantially along the line 7—7 of FIG. 6.
Figure 6:
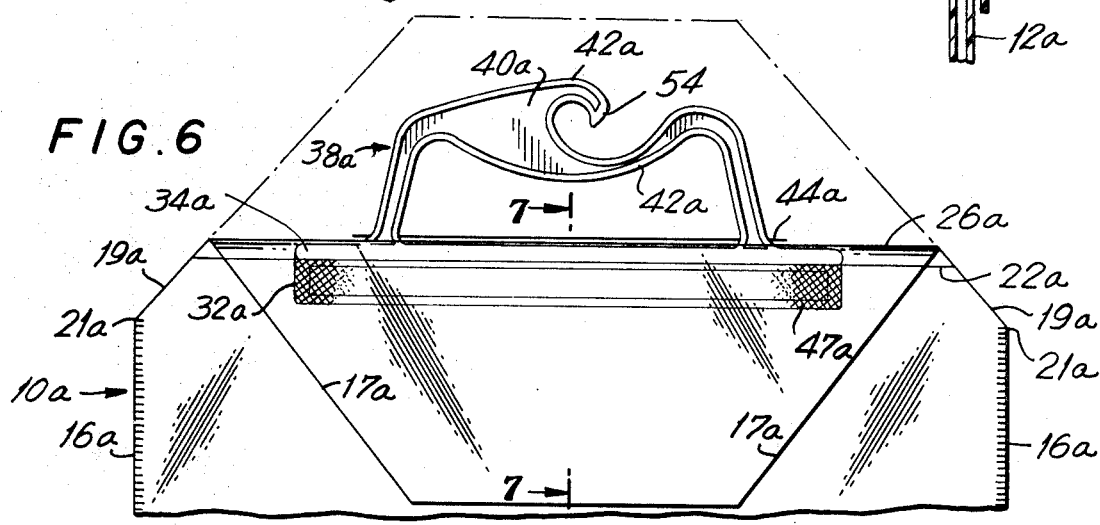
FIG. 6 is an enlarged fragmentary front view of the embodiment shown in FIG. 5 with the flap in a folded over position, additionally shown in dot-and-dash lines is the flap in open position.

An alternate embodiment of the invention is illustrated in FIGS. 5, 6 and 7. The display bag 10a illustrated therein includes opposed registered front 12a and rear 14a films of polyethylene which form a tote bag. The films are joined and sealed at the side edges 16a and the bottom edge is preferably a fold line joining the opposed films.

In this embodiment, the suspension member 30a includes a base 32a, and a reinforcing strip 34a, both constructed in a manner identical to the construction of the embodiment previously described.

In lieu of a suspension hook, however, a tote handle 38a is formed. The tote handle includes a web 40a projecting upwardly from the reinforcing strip 34a and forming an inverted U (bail). The periphery of the web 40a is surrounded by an integral flange 42a. Additionally, the top reach of the inverted U-shaped web is widened and in a cutout area of the reach is a hook formation 54 which optionally allows the tote bag to be suspended from a post or a rod of narrow diameter. The tote handle may thus serve to provide a gripping surface whereby the bag may be held in one's hand; or, alternately, by the hook 54, it is possible to suspend the bag from a post or the like. Both the tote handle and the hook 54 are symmetrically disposed with respect to the suspension member and the tote bag so that there is a minimum imbalance when the bag is suspended from or carried by the tote handle.

To be additionally noted in this embodiment is the manner in which the flap 20a is formed. It can be observed from FIG. 5 that the side edges 17a of the flap are downwardly outwardly tapering toward the outer edges 16a of the bag. This minimizes any unaesthetic appearance that anyone may feel results from the requisite difference between the length of the base 32a and the width of the bag 10a. The upper edge 22a of the front film 12a is cut along sloping lines 19a extending toward the outer edge 16a and registered with the side edge of the flap 17a. When the flap 20a is folded downwardly over the upper edge 22a, the fold line of the flap 26a is at an elevation above the end 21a of the upper extremity of the sealed edge 16a.

There is thus formed a space between the upper edge 22a of the front film 12a and the upper end 21a of the sealed side seam 16a. This space facilitates the opening and closing the of the flap in the manner previously described.

With the flap in the open position as shown in the dot-and-dash lines of FIG. 6, it is necessary to insert the carry handle 38a through the slit 44a in order to close the flap. This is done in a manner similar to that previously discussed with regard to the first embodiment. As can be seen in FIG. 5, the front film is pulled away from the rear film 14a adjacent the upper edge 22a. The suspension member 30a is simultaneously swung toward the rear film and, of course, the front film must be spaced from the rear film a distance which will permit a suspension member to swing so that it may be inserted through the slit. With the upper edge 22a spaced from the upper ends 21a of the sealed seams by the line 19a, the upper edge 22a may be pulled outwardly away from the rear film to a greater distance (approximately double the length of the line 19a).

Figure 8:
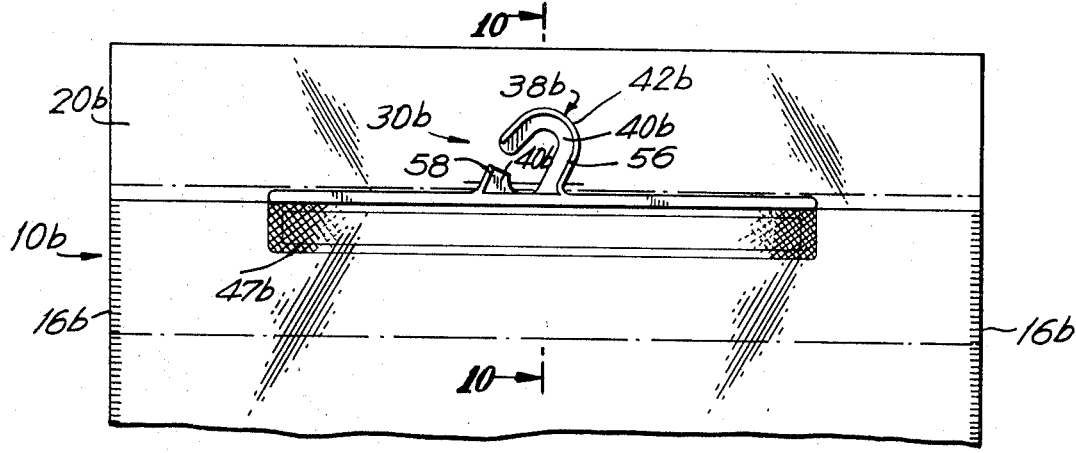
FIG. 8 is a fragmentary front view of a further embodiment of the invention showing a different kind of a hook suspension member.

A further embodiment of the invention is illustrated in FIGS. 8, 9, and 10. In this embodiment, the suspension member 30b is similar to those of the previous embodiments. However, the suspension hook 38b projects upwardly from the center of the suspension member and is constructed of a web 40b shaped in the manner of a reversed C having a restricted throat opening. The C formation includes a sloping leg 56 which is arcuately bent at its upper end and the upper tip of which is downwardly turned. Projecting upwardly from a position spaced from the leg 56, a second leg 58, additionally constructed of the web material 40b, is found. Between the spaced tips of the legs 56 and 58 the restricted throat is presented.

To reinforce the suspension hook 38b, a flange 42b is integrally formed along the exterior surface of the suspension member.

The entire suspension member is molded of one-piece polyethylene construction and the legs 56 and 58 are resilient, durable and elastic so that the restricted throat may be easily forced open and enlarged by bending the downturned tip of the leg 56 to permit the hook to slip over a display rod and be held captive thereon.

To disengage the hook from the supporting rod, it is necessary to open the restricted throat by bending the tip of the leg 56.

The bag 10b as illustrated in the solid lines of FIG. 8 is shown with the flap 20b in open position and thus the mouth of the bag is open. In order to close the bag after the merchandise has been inserted or removed, it is necessary to spread apart the opposed front and back films as discussed with regard to previous embodiments and as is illustrated in FIG. 9.

As can be seen in FIG. 9, the distance which the suspension hook 38b projects beyond the edge 22b of the front film is not great and therefore the opposed films need not be spread apart extensively before the suspension hook can be swung and inserted through the slit. Once the suspension hook engages the slit, it is thrust therethrough and the flap is then folded over the upper portion of the front film closing the mouth of the bag. The flap is illustrated in this folded-over position in the dashed lines of FIGS. 8 and 10.

A still further embodiment of the present invention is illustrated in FIGS. 11, 12 and 13 wherein another tote bag 10c having a single suspension handle is illustrated. The lower portion of the suspension member is identical to those of the previous embodiments and includes a horizontal base 32c and a reinforcing bar 34c. Projecting upwardly form the bar 34c and centrally situated thereon is a suspension handle 38c. This handle is formed of a web 40c shaped in the manner of an inverted U (bail) and additionally surrounded by a reinforcing flange 42c.

At the top reach of the handle, the web is of a greater width than at the pendant legs. The web and flange are arcuately indented at 59 on the lower edge of the reach at the center thereof. The arcuate indentation 59 facilitates the balancing of a bag in a suspended position, i.e. hanging from a hook or post 60 which would engage the indentation as illustrated in dot-and-dash lines in FIG. 11. Of course, in order to properly balance the bag handle and any contents therein, the suspension member is centrally positioned between the edges 16c of the bag and the arcuate indentation 60 lies within the vertical plane of the geometric center of the bag.

As illustrated in FIGS. 11 and 12, the side edges 19c of the front film 12c adjacent the upper edge 22c are not joined to the rear film. Thus there is a distance between the upper ends 21c of the sealed seams 16c and the upper edge 22c of the front film. This spaced unseamed portion further facilitates the separation of the films and the swinging of the suspension member as the suspension handle is inserted through the slit 44c in the manner similar to that described with respect to the previous embodiments.

It is to be observed that the different shapes and types of suspension members are not novel per se, but have been illustrated in order to demonstrate the versatility of the present new bag/suspension member assembly.

It thus will be seen that there are provided devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

I claim:

1. A limp flexible bag suitable for carrying articles of merchandise and being supported in a pendant position, said bag comprising opposed registered front and rear films of limp flexible sheet material, said films being joined along the registered side and bottom edges thereof, said rear film normally projecting above the upper edge of said front film to form a closure flap, said bag having an open mouth between the upper edges of the front film and the rear film, a portion of the rear film opposite the upper edge of the front film being bendable and forming a fold line, the flap being foldable along said fold line to cover the open mouth and overlie a portion of the front film adjacent the upper edge of the latter, a stiff suspension member having a base and a suspension means, said suspension means projecting upwardly from said base, a surface of said base being attached to the front film adjacent the upper edge thereof with the suspension means projecting upwardly above the upper edge of the front film, said rear film having a transverse opening positioned adjacent the fold line of the rear film, the suspension means having a transverse dimension which is less than the length of the opening, the length of the base being less than the width of the bag by about at least half of the distance the suspension member projects above the base so as to allow the front and rear film to be spread apart sufficiently to enable the suspension means to be passed through the opening, the suspension means thereby being insertable through the opening and permitting the flap to be folded over the mouth of the bag and the front film, the suspension means serving to prevent the subsequent opening of the flap unless withdrawn through the opening, whereby while the suspension means projects through the opening and the bag is held in an elevated position by the suspension member, the closure flap may not be opened.

2. A bag constructed in accordance with claim 1 wherein the suspension base is positioned on the front film equidistantly spaced from the sides of said films, the suspension means is centrally positioned along the length of the base and the opening is centrally positioned between the side edges of the rear film, said bag assuming a vertical position when the suspension means engages a fixed support and the bag freely hangs therefrom.

3. A bag constructed in accordance with claim 1, wherein the opposed registered side edges of the front and rear films are joined, the joint terminating at upper ends, the upper edge of the front film being spaced from the upper ends of the joint, whereby the upper edge of the front film is movable away from the transverse opening of the rear film.

4. A bag constructed in accordance with claim 1 wherein the bag and suspension member are of polyethylene and wherein a surface of the base of the suspension member is heat fused to the front film and includes a plurality of tiny raised contiguous portions, said raised portions being bonded to the opposed mating surface of the front film.

5. A bag constructed in accordance with claim 4 including a fused area between the base and the front film, said fused area containing the bonded portions of the base and front film, said fused area being smaller than a zone defined by said portions jointly and lying within said zone.

6. A limp flexible bag suitable for carrying articles of merchandise and being supported in a pendant position, said bag comprising opposed registered front and rear films of limp flexible sheet polyethylene, said films being joined along the registered side and bottom edges thereof, a stiff suspension member, said suspension member having a base and a suspension means, with said suspension means projecting upwardly from said base, a surface of said base including a plurality of tiny raised portions, said surface being heat fused to one of the films forming the bag with the raised portions being bonded to the abutting surface of the film.